United States Patent

Miller et al.

[11] 4,047,166
[45] Sept. 6, 1977

[54] ELECTROSTATICALLY CHARGED CABLE TRANSDUCER

[75] Inventors: G. Kirby Miller, Saratoga; John F. Lawler, Los Altos, both of Calif.

[73] Assignee: GTE Sylvania Incorporated, Mountain View, Calif.

[21] Appl. No.: 718,844

[22] Filed: Aug. 30, 1976

Related U.S. Application Data

[63] Continuation-in-part of Ser. No. 652,375, Jan. 26, 1976, abandoned.

[51] Int. Cl.$^2$ .............................................. G08B 13/10
[52] U.S. Cl. .................................. 340/261; 340/258 R
[58] Field of Search ............................ 340/258 R, 261

[56] References Cited

U.S. PATENT DOCUMENTS

| 3,763,482 | 10/1973 | Burney et al. | 340/258 R |
| 3,833,897 | 9/1974 | Bell et al. | 340/258 R |
| 3,846,780 | 11/1974 | Gilcher | 340/261 |
| 3,947,835 | 3/1976 | Laymon | 340/261 |

*Primary Examiner*—Glen R. Swann, III
*Attorney, Agent, or Firm*—John F. Lawler

[57] ABSTRACT

The sensitivity of a buried electrostatically charged cable transducer, such as an electret cable, to mechanical disturbances caused by men, vehicles and the like moving on the surface of the ground is greatly improved by disposing the cable loosely in a coextensive rigid hollow member such as a tube. The inside dimension of the tube is larger than the outside diameter of the cable, the cable being supported on the inner surface of the tube at longitudinally randomly spaced points. The cable is thus free to move radially relative to the tube in response to pressure waves or vibrations propagating through the ground and incident on the exterior of the tube so as to bend, twist, compress and/or otherwise stress the cable and generate corresponding electrical signals between the inner and outer conductors of the cable. The enclosing tube forms no part of the electrical circuit and accordingly may be and preferably is made of low cost nonconductive plastic material; with such a non-conductive tube, the outer jacket or covering of the cable may be omitted so as to further increase energy coupling efficiency between the tube and cable and thus increase the transducer sensitivity. The plastic tube additionally constitutes an effective moisture-proof corrosion-resistant seal for the cable. The cable may be the coaxial type or the twisted line type with the dielectric between the conductors being electrostatically charged.

15 Claims, 7 Drawing Figures

ELECTROSTATICALLY CHARGED CABLE TRANSDUCER

CROSS REFERENCE TO RELATED APPLICATION

This is a continuation-in-part of Ser. No. 652,375 filed Jan 26, 1976, now abandoned.

BACKGROUND OF THE INVENTION

This invention relates to cable transducers and more particularly to such transducers that are buried in the ground for detection of ground disturbances. One application of the invention is in intrusion detection systems.

The coaxial cable transducer described in U.S. Pat. No. 3,763,482 has been very successful in fence applications where the sensor cable is clamped directly to the fence body. Cable sensitivity to vibrations induced in the fence structure by intruders attempting to climb it is high partly because of the efficient transfer of mechanical energy from the fence to the cable. However, when the cable is buried in the ground as a sensor for detecting surface disturbances such as an intruder's footsteps, the ground motion is relatively uniform along the cable surface so that the cable tends to move with it without producing significant displacement between the conductors and thus, in effect, reducing the sensitivity of the cable to the seismic energy. An additional factor is the lack of penetration of the surface pressure beneath a footstep due to the finite stiffness of the intervening material. The degree of this effect depends upon the cohesiveness of the ground and will vary, for example, between frozen and unfrozen ground, the cable being less sensitive under the latter condition.

A principal advantage of the cable transducer described in the foregoing patent is that it may be produced from conventional coaxial hookup wire at relatively low cost per unit length. Such hookup cable, however, is not designed to withstand continuous exposure to moisture and other corrosive elements present in the ground. Since moisture penetration of the outer jacket of the cable impairs or destroys its sensitivity, special moisture-proofing treatment of the cable is required to adapt it for buried installations at higher costs and with the possible additional disadvantage of reduction of sensitivity.

Another inexpensive electrostatically charged cable capable of detecting vibrations, pressure waves and the like mechanical disturbances is the twisted pair cable described in copending application of M.D. Laymon and G.K. Miller, Ser. No. 718,845, assigned to the assignee of this invention. This cable is likewise susceptible to the adverse effects of moisture penetration when buried in the ground.

OBJECTS AND SUMMARY OF INVENTION

A general object of this invention is the provision of an underground cable sensor having substantially improved sensitivity.

A further object is the provision of a buried sensor of this type which is also waterproof and corrosion-proof.

Still another object is the provision of such an underground coaxial electret cable detection system which may be produced at relatively low cost.

A specific object is the provision of a cable sensor having good sensitivity to intruder footsteps and the like when buried in either frozen or unfrozen ground.

These and other objects of the invention are achieved by disposing an electrostatically charged coaxial cable, with or without its outer jacket, or alternatively a similarly charged twisted pair cable, within a rigid tubular member that has an inside diameter greater than the outside diameter of the cable. The cable is free to move within the tube, being supported thereon at longitudinally spaced points of contact. This in effect enables the normally pressure-sensitive cable to also be especially sensitive to acceleration. The particle motion associated with seismic waves in the ground caused by surface disturbances is efficiently coupled by the tube to the cable in this accelerometer mode so as to greatly increase transducer sensitivity. In addition, the tube serves to protectively seal the cable.

DESCRIPTION OF PREFERRED EMBODIMENTS

Figure 1:
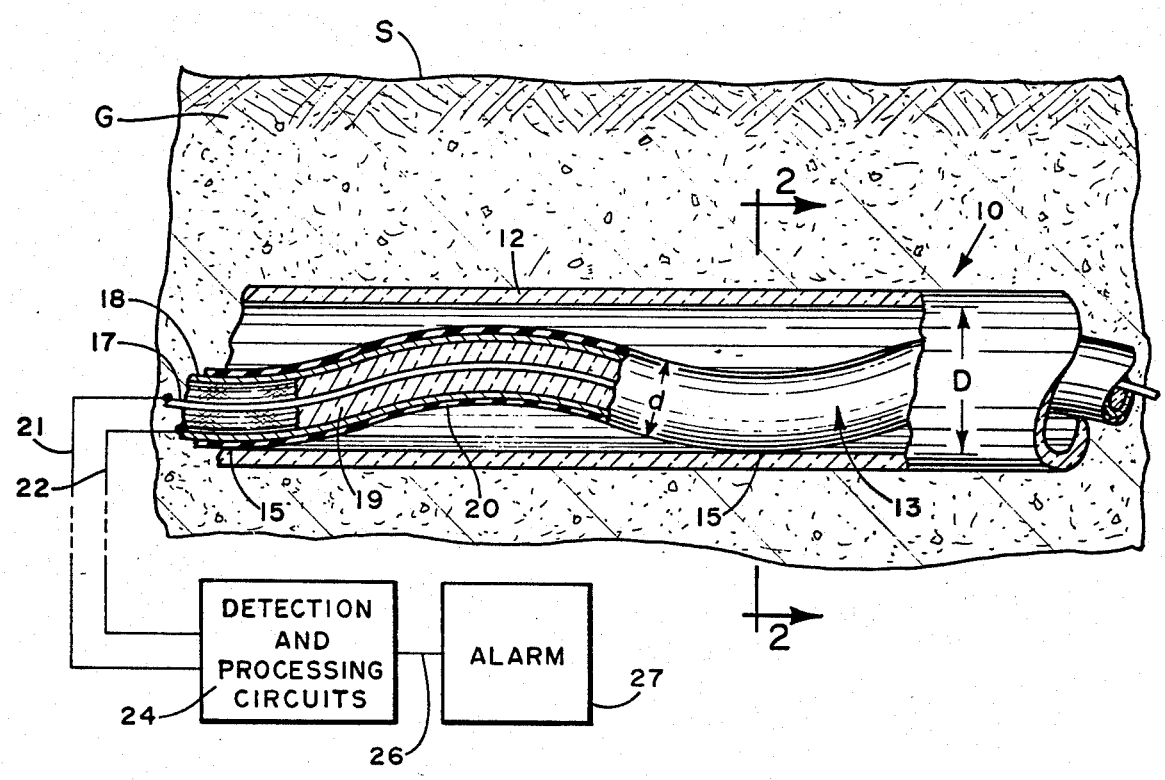
FIG. 1 is a schematic view partly in section of a buried system embodying the invention featuring a coaxial electret cable in the tube.
Figure 2:
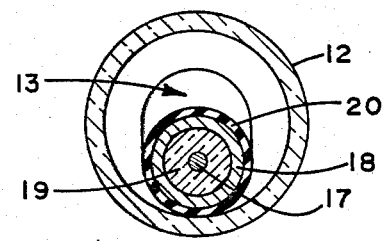
FIG. 2 is a section taken on line 2—2 of FIG. 1.

Referring now to the drawings, FIGS. 1 and 2 show part of an elongated line sensor 10 buried in the ground G below its surface S and comprising a tubular member 12 enclosing a coaxial cable 13. The inside diameter D of tube 12 is larger than the outside diameter d of cable 13 so that the latter is free to move within and is loosely supported on the tube interior at longitudinally spaced points 15 of contact. Tube 12 is somewhat rigid structure and preferably is made of a suitable inexpensive plastic material such as polyurethane.

Cable 13 has an inner conductor 17, an outer conductor 18 and a dielectric filler 19 between these conductors conditioned to have an electrostatic charge. This charge may be produced by a DC bias applied to conductors 17 and 18 or filler 19 may be and preferably is an electret. A thin outer jacket 20 of suitable insulating material such as polyvinylchloride or the like encloses and seals the cable structure.

The inner and outer conductors 17 and 18 of cable 13 are connected by lines 21 and 22, respectively, to detection and signal processing circuits 24 of the type described in the aforementioned patent. Briefly, circuit 24 may comprise an amplifier-filter, an integrator and a threshold device. The output of circuit 24 is connected by line 26 to an alarm generator 27.

In operation, waves generated in the ground G by disturbances on the surface S caused by human footsteps, vehicular traffic, or the like are transmitted to tube 12 which is displaced correspondingly relative to cable 13. Since cable 13 is free to move within the tube, the relative displacement of these parts changes the stress on the cable as a result of bending and twisting of the cable as well as a change in radial compression at the points 15 of contact. The net effect of this stressing of the cable is a change in the radial spacing between the outer conductor 18 and the adjacent charged surface of dielectric filler 19 which produces an electrical signal on lines 21 and 22. This effect is more completely explained in the foregoing patent.

The substantial increase in sensitivity of the buried charged cable in a tube compared to a similar cable buried without a tube is believed to be due to the more effective coupling of the particle motion associated with seismic disturbance to the outer conducting layer of the cable in the former configuration. This occurs for low disturbances such as those caused by the footsteps of a slowly moving or stealthy intruder, i.e., in the 0.05-10 Hz range, as well as higher frequency waves caused by a faster walking or running intruder or fast moving vehicle producing waves at frequencies at 10-100 Hz. The stress on the cable in response to mechanical excitation of the tube by these waves is more complete and the transducer action is therefore more efficient. Without a tube, a buried electret cable is responsive substantially only to radial compression forces resulting from the surface disturbances. Although such cable is capable of detecting these disturbances, its sensitivity is not as high as the cable-in-a-tube configuration. Laboratory shake table tests show an increase in sensitivity to acceleration forces of over 20 dB for the enclosed cable compared to the exposed cable. Thus, high frequency sensitivity is especially enhanced.

Figure 3:
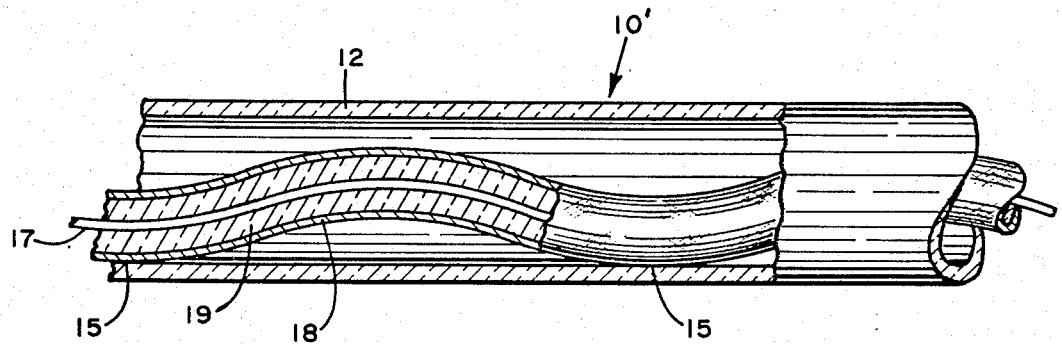
FIG. 3 is a view similar to FIG. 1 showing a modified form of the invention.

A modified form of the invention is embodied in the sensor 10' shown in FIG. 3 wherein like parts are indicated by like reference characters on the drawings. In this embodiment, the sensor configuration is the same as described above except that the cable jacket has been removed thereby exposing the outer conductor 18 to direct contact with the interior of the tube 12 as shown. This results in a more efficient transmission of mechanical energy from the tube to the outer conductor and further increases transducer sensitivity of the cable as a consequence. The cable is connected to signal processing circuits as described above and in other respects operates in the same manner.

Tube 12 in the FIG. 1 embodiment, while preferably made of plastic or the like for reasons of economy and corrosion resistance, may be made of electrically conductive material without affecting the operation of the sensor line. On the other hand, tube 12 in the FIG. 3 embodiment should be made of an electrically nonconductive material in order to electrically isolate the cable from the surrounding ground.

Figure 4:
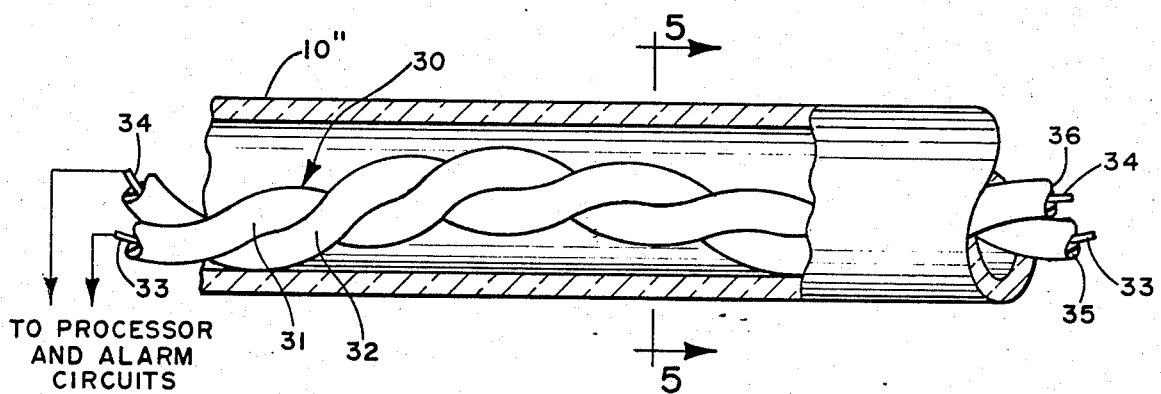
FIG. 4 is a view similar to FIG. 1 showing an alternative embodiment with a twisted line pair electret cable in the tube.
Figure 5:
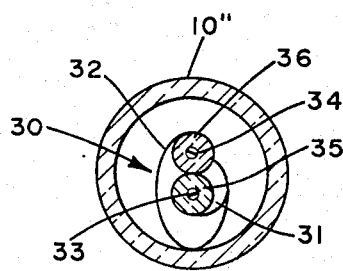
FIG. 5 is a transverse section taken on line 5—5 of FIG. 4.

The invention is also practiced with advantage by loosely disposing within a tube 10" a cable 30, see FIGS. 4 and 5, comprising a twisted pair of contiguous lines 31 and 32 having conductors 33 and 34, respectively, insulated by coverings or jackets 35 and 36, respectively, of electrostatically charged dielectric material (electret) such as Teflon. Lines 31 and 32 are twisted in a longitudinal direction and preferably about each other into longitudinally extending helices with the electret jackets of each tightly engaging the other as shown in FIGS. 4 and 5. Alternatively, the pair of lines 31 and 32 may be twisted in a longitudinal direction so that the position of each line relative to the other does not change. The outer diameter of cable 30, like that of coaxial cable 13, is less than the inside diameter of tube 10" and the cable, being loosely disposed, makes random contact with and is free to move within the tube. Vibrations and/or pressure waves propagating through the ground to tube 10" cause relative movement of cable and tube. This induces stress in the cable which varies the spacing between the conductor of one line and the jacket of the other and produces a corresponding electrical signal between conductors 33 and 34 that is detected and processed by the attached processor and alarm circuits. Tube 10" is rigid and preferably is made of an electrically nonconductive material such as polyvinylchloride (PVC) in view of the low cost although a metallic tube may be used if desired since both conductors are insulated.

Figure 6:
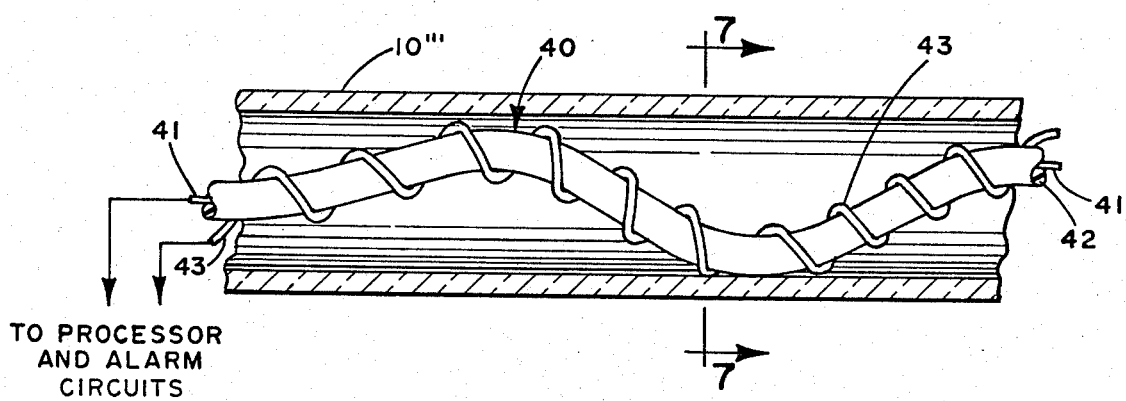
FIG. 6 is a view similar to FIG. 4 showing still another form of the invention.
Figure 7:
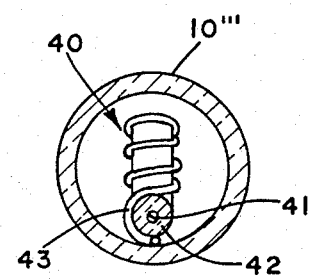
FIG. 7 is a transverse section taken on line 7—7 of FIG. 6.

Another embodiment of the invention is shown in FIGS. 6 and 7 and comprises a rigid tube 10''' in which a line 40 is loosely disposed. Line 40 comprises a conductor 41 covered by an electrostatically charged jacket 42, preferably an electret, and a bare wire-like conductor 43 wound, preferably snugly, around the exterior of jacket 42 in the form of a helix throughout the length of the line. Disturbances transmitted through the ground to tube 10''' induce stress in line 40 so as to change the spacing between bare conductor 43 and the charged outer surface of jacket 42 and thereby generate a signal between conductors 41 and 43. Since tube 10''' is engaged by conductor 43 at various points along its length, the tube is made of an electrically nonconductive material such as PVC in order to insulate the sensor from the ground.

While the invention has been described as embodied in an underground intrusion detection system, its utility is not limited to such systems but is useful with advantage for any sensor application in which use of the rigid tubular enclosure is practicable. For example, the cable-in-a-tube sensor may be deployed on top of the ground to detect intruders, in the ocean to detect seismic exploration soundings, or in floors of buildings and the like. The cable may also be inserted in already installed substantially rigid conduits regardless of composition to provide a disturbance detection capability at minimal installation costs. It will also be understood that the enclosing member may have a shape other than cylindrical as shown. Also, the generally cylindrical configuration of the coaxial cable sensor is not essential to the transducer action and therefore other shapes of such cable may be used albeit standard cylindrical coaxial cable is preferred because of its commercial availability and low cost.

What is claimed is:

1. Mechanism for detecting disturbances which propagate waves in a medium comprising
   an elongated generally rigid hollow member adapted to be buried in said medium and responsive to said waves, and
   a cable disposed within and engageable with said member, said cable having first and second conductors spaced by an electrostatically charged material and having an outside transverse dimension less than the inside transverse dimension of said member whereby the member and cable are movable relative to each other in response to said waves for generating electrical signals between said conductors.

2. The mechanism according to claim 1 in which said member comprises an electrically conductive material.

3. The mechanism according to claim 1 in which the exterior of said cable is defined by one of said conductors.

4. The mechanism according to claim 1 in which the exterior of said cable is defined by a nonconductive covering.

5. The mechanism according to claim 1 in which said cable is a coaxial type.

6. The mechanism according to claim 3 in which said hollow member comprises an electrically nonconductive material.

7. The mechanism according to claim 1 in which said conductors are twisted into longitudinal helices, at least one of said conductors having an enclosing jacket made of said electrically charged material.

8. The mechanism according to claim 7 in which said conductors are twisted about each other.

9. The mechanism according to claim 7 in which the other of said conductors has an enclosing jacket made of said electrostatically charged material.

10. A system for detecting disturbances in the ground along the perimeter of a protected area caused by human footsteps, by vehicles or the like comprising
   a line sensor buried in the ground along said perimeter and responsive to said disturbances, said sensor comprising
   a generally rigid hollow member,
   a cable disposed within said member and having an external cross-sectional dimension less than the internal cross-sectional dimension of said member whereby the cable is free to move transversely of and relative to said member, said cable engaging said member at randomly spaced points and having first and second space conductors and a dielectric between said conductors, said dielectric having an electrostatic charge thereon whereby a change in the spacing between said first conductor and said dielectric produces an electrical signal across said conductors, and
   signal processor means connected to said first and second conductors for processing said signals.

11. The system according to claim 10 in which said cable is a coaxial type and said first and second conductors are the outer and inner conductors, respectively, thereof, said cable having a nonconductive jacket around said outer conductor.

12. The system according to claim 10 in which said member comprises an electrically nonconductive tube, said cable being a coaxial cable and said first and second conductors being the outer and inner conductors, respectively, thereof, the exterior surface of said cable being defined by said outer conductor.

13. The system according to claim 10 in which said first conductor is wound about said second conductor in the form of a longitudinal helix, said dielectric comprising the covering on one of said conductors.

14. The system according to claim 13 in which said dielectric material comprises the coverings on said first and second conductors.

15. The system according to claim 13 in which said member comprises an electrically nonconductive tube, said first conductor being engageable with said tube.

* * * * *